United States Patent
Zhou et al.

(10) Patent No.: US 7,916,384 B2
(45) Date of Patent: Mar. 29, 2011

(54) FEEDBACK DYNAMIC GAIN CONTROL FOR A WDM SYSTEM EMPLOYING MULTI WAVELENGTH PUMPED RAMAN FIBER AMPLIFIERS

(75) Inventors: Xiang Zhou, Holmdel, NJ (US); Martin Birk, Belford, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 11/381,244

(22) Filed: May 2, 2006

(65) Prior Publication Data

US 2007/0258132 A1  Nov. 8, 2007

(51) Int. Cl.
*H04B 10/17* (2006.01)
*H04B 10/12* (2006.01)

(52) U.S. Cl. .................................................. 359/334

(58) Field of Classification Search ............ 359/334
See application file for complete search history.

(56) References Cited

U.S. PATENT DOCUMENTS

| | | | |
|---|---|---|---|
| 6,236,500 B1 | 5/2001 | Suzuki et al. | |
| 6,417,965 B1 | 7/2002 | Ye et al. | |
| 6,441,950 B1 * | 8/2002 | Chen et al. | 359/334 |
| 6,498,677 B1 | 12/2002 | Sun et al. | |
| 6,510,000 B1 | 1/2003 | Onaka et al. | |
| 6,542,287 B1 * | 4/2003 | Ye et al. | 359/334 |
| 6,574,037 B2 | 6/2003 | Islam et al. | |
| 6,624,926 B1 | 9/2003 | Hayashi et al. | |
| 6,661,570 B2 | 12/2003 | Nakaji | |
| 6,690,504 B1 | 2/2004 | Nagel et al. | |
| 6,724,524 B1 * | 4/2004 | Evans et al. | 359/334 |
| 6,738,132 B2 * | 5/2004 | Sobe et al. | 356/73.1 |
| 6,791,745 B2 | 9/2004 | Wingstrand et al. | |
| 6,798,567 B2 | 9/2004 | Feldman et al. | |

(Continued)

FOREIGN PATENT DOCUMENTS

| | | |
|---|---|---|
| EP | 1248 334 | 10/2002 |
| EP | 1317083 A2 | 6/2003 |
| EP | 1589623 A2 | 10/2005 |

(Continued)

OTHER PUBLICATIONS

Yihong, Chen at al., "Bi-directionally pumped broadband Raman amplifier," ECOC, Sep. 2001, pp. 230-231, Freehold, NJ.

(Continued)

*Primary Examiner* — Eric Bolda

(57) ABSTRACT

An improved feedback-based dynamic gain control technique for a WDM system employing multi-wavelength-pumped Raman fiber amplifiers (RFAs) is proposed, in which only one feedback or feed-forward signal is required for the control of multiple Raman pumps. Compared to the traditional method requiring multiple feedback signals for multiple pumps, the proposed method results in substantial simplification of the control circuit and also exhibits faster control speed. Moreover, the proposed method allows use of the total signal gain as the feedback signal, which is more robust against polarization-related issues than the traditional method using signal powers at several different channels as the feedback signals. The improved technique has advantage for dynamic gain control in a backward-pumped distributed RFA because the feedback signal may be detected right after the RFA. For feed-forward, a telemetry channel may be used to send the feed-forward signal to a feed-forward control circuit for the multiple Raman pumps. In addition, the feed-forward control technique and the feedback control technique may be used together to achieve better performance than using each of them separately to control multiple Raman pumps. Polarization-related issues may be reduced by utilizing amplified spontaneous emission (ASE) noise as the feedback signal for a feedback-based gain control circuit for the RFA.

13 Claims, 7 Drawing Sheets

U.S. PATENT DOCUMENTS

| | | | |
|---|---|---|---|
| 6,958,856 B2 | 10/2005 | Inoue et al. | |
| 6,985,284 B2 | 1/2006 | Denkin et al. | |
| 7,038,843 B2 | 5/2006 | Denkin et al. | |
| 7,068,421 B2* | 6/2006 | Tokura et al. | 359/334 |
| 7,142,356 B2* | 11/2006 | Zhou et al. | 359/334 |
| 2001/0003550 A1* | 6/2001 | Yamaguchi | 385/24 |
| 2002/0044343 A1 | 4/2002 | Manzur | |
| 2002/0054733 A1 | 5/2002 | Kagi et al. | |
| 2002/0140927 A1* | 10/2002 | Sobe et al. | 356/73.1 |
| 2002/0145796 A1* | 10/2002 | Kikuchi et al. | 359/341.33 |
| 2002/0159134 A1* | 10/2002 | Ghera et al. | 359/334 |
| 2002/0186456 A1 | 12/2002 | Inoue et al. | |
| 2003/0095323 A1* | 5/2003 | Onaka et al. | 359/334 |
| 2003/0147124 A1 | 8/2003 | Inoue | |
| 2003/0210457 A1 | 11/2003 | Emori et al. | |
| 2004/0052453 A1 | 3/2004 | Mao et al. | |
| 2005/0105167 A1* | 5/2005 | Martinelli et al. | 359/334 |
| 2006/0187538 A1* | 8/2006 | Zhou et al. | 359/341.1 |
| 2007/0058242 A1* | 3/2007 | Zhou et al. | 359/337.12 |
| 2007/0109623 A1* | 5/2007 | Zhou et al. | 359/333 |
| 2007/0109624 A1* | 5/2007 | Zhou et al. | 359/333 |
| 2007/0109625 A1* | 5/2007 | Zhou et al. | 359/333 |
| 2007/0109626 A1* | 5/2007 | Zhou et al. | 359/333 |
| 2007/0109627 A1* | 5/2007 | Zhou et al. | 359/333 |

FOREIGN PATENT DOCUMENTS

| | | |
|---|---|---|
| EP | 1317083 A3 | 1/2006 |
| GB | 2383209 A | 6/2003 |
| WO | 2004032383 | 4/2004 |

OTHER PUBLICATIONS

Kado, Soko et al., "Broadband flat-noise Raman amplifier using low-noise bi-directionally pumping sources," ECOC, 2001, pp. 1-2, Kanagawa, Japan.

Essiambre, Rene-Jean et al. "Design of Bidirectionally Pumped Fiber Amplifiers Generating Double Rayleigh Backscattering," IEEE Photonics Technology Letters, Jul. 2002, pp. 914-916, vol. 14, No. 7, USA.

Bromage, J. et al., "High co-directional Raman gain for 200-km spans, enabling 40×10.66 Gb/s transmission over 2400 km," OFC, 2003, pp. PD24-1 to PD24-3, Holmdel, NJ.

Chen, C.J. et al., "Control of transient effects in distributed and lumped Raman amplifier," Electronic Letters, Oct. 2001, pp. 1304-1305, vol. 37, No. 21, USA.

Wang, L.L., et al., "Gain transients in co-pumped and counter-pumped Raman amplifiers," IEEE Photonics Technology Letters, May 2003, pp. 664-666, vol. 15, No. 5, USA.

Zhou, Xiang et al., "Theoretical investigation of fiber Raman amplifier with dynamic gain control", OFC, 2001, pp. WDD17-1-WDD17-3, Singapore.

Bolognini, G. et al., "Transient effects in gain-clamped discrete Raman amplifier cascades", IEEE Photonics Technology Letters, Jan. 2004, pp. 66-68, vol. 16, No. 1, USA.

Zhou, Xiang et al., "Submicrosecond Transient Control for a Forward-Pumped Raman Fiber Amplifier", IEEE Photonics Technology Letters, 2005, pp. 2059-2061, vol. 17, No. 10, USA.

Zhou, Xiang et al., "A new technique for dynamic gain profile control in a multi-wavelength backward-pumped discrete Raman amplifier", 2001, pp. 1-3. USA.

Kim, Pilhan et al. "Semianalytic Dynamic Gain-Clamping Method for the Fiber Raman Amplifier", IEEE Photonics Technology Letters, Apr. 2005, pp. 768-770, vol. 17, No. 4, USA.

Zhou, Xiang et al. "Fast, low-cost method for control of gain and tilt transients in a forward-pumped Raman amplifier", Sep. 2005, USA.

* cited by examiner

FEEDBACK DYNAMIC GAIN CONTROL FOR A WDM SYSTEM EMPLOYING MULTI WAVELENGTH PUMPED RAMAN FIBER AMPLIFIERS

FIELD OF THE INVENTION

The present invention relates generally to the operation of optical amplifiers for use in telecommunications applications where telecommunications applications encompass the convergence of cable television, high speed data including but not limited to internet protocol data and conventional voice and other very high speed data services and, more particularly, to an improved technique for dynamically controlling the gain in a wavelength-division-multiplexing (WDM) system employing multi-wavelength-pumped Raman fiber amplifiers (RFA's).

BACKGROUND OF THE INVENTION

Distributed Raman fiber amplification (directly using the transmission fiber as the gain medium) is a powerful technique to improve the optical signal to noise ratio margin of long haul wavelength-division-multiplexing (WDM) systems used, for example, for long-haul telecommunications transmission. Discrete Raman fiber amplifiers (RFA) using dispersion-compensation fiber (DCF), special highly nonlinear fiber or other optical fiber with similar characteristics as the gain mediums have also received much attention in recent years due to their advantage of flexible bandwidth design with relatively low noise characteristics.

Referring to FIG. 1(a), a distributed/discrete RFA may be configured as a forward-pumped RFA (the signal light 100 and the Raman pump light (m pumps 103) co-propagate in the fiber 101 of WDM system 102 or, referring to FIG. 1(b), may be configured as a backward-pumped RFA (the signal light 100 and the Raman pump light 103 counter-propagate in the fiber 101)). Similar reference characters are used throughout the figures to represent similar elements. The first number of a reference numeral refers to the drawing number where that element first appears. In a common Raman/Erbium Doped Fiber Amplifier (EDFA) hybrid WDM system, usually only backward-pumped distributed RFAs are used, but both forward-pumped RFAs (distributed) and backward-pumped RFAs (distributed and discrete) may be used in a Raman-only WDM system. In Europe, rare earth doped optical fiber, other than Erbium doped, such as Praseodymium doped optical fibers have been utilized.

Referring to FIG. 1(c), the flat gain bandwidth provided by a single Raman pump is only about 10 nm. The dotted line arrows of FIG. 1(c) point from a pump to its representative energy transfer characteristic shown in dashed line. But the Raman gain spectrum can be broadened by providing pump energies at a plurality of different wavelengths as is illustrated in FIG. 1(c) where three Raman pumps are shown. The broadening is shown by the composition of the energy transfer characteristics of the three depicted pumps as a composite Raman gain profile in solid line having a much wider, flat bandwidth gain characteristic. While only three pumps are shown, for a typical C/L-band WDM system, usually four Raman pumps at different wavelengths are required to achieve a flat gain spectrum over a broad bandwidth. More pumps may be used to similarly achieve still wider bandwidth than C/L band.

However, a RFA with a constant pump level will not produce a well-controlled output signal in response to large variations in the input signal level, which could be caused, for example, by channel add/drop, accidental fiber cuts or upstream amplifier failure among other similar events in a photonic network using reconfigurable OADMs (optical add-drop multiplexer). With fixed pump powers, if the input signal power decreases suddenly due to channel drops, the Raman gain becomes too high, and the output power per channel increases more than desired. On the other hand, if the input signal power suddenly increases due to the addition of new channels, the Raman pumps become depleted, which causes the output power per channel to decrease more than desired. In our co-pending, concurrently filed U.S. patent application Ser. No. 11/381,244, filed, May 2, 2006, which application is incorporated by reference as to its entire contents, there is described a method and apparatus for quickly controlling tilt transients.

To stabilize the gain profiles of a RFA during channel add/drop, several control methods are known. These include an all-optical gain-clamping technology described by inventor Xiang Zhou and others and a PID (proportional-integral-derivative) based feedback pump power control technique described by C. J. Chen et al., "Control of Transient Effects in Distributed and Lumped Raman Amplifier," *Electronic Letters*, pp. 1304-05, October, 2001; L. L. Wang et al., "Gain Transients in Co-pumped and Counter-pumped Raman Amplifiers," *IEEE Photonics Technology Letter*, pp. 664-666, May, 2003, and M. Karasek et al., "Modeling of a Pump-power-controlled Gain-locking System for multi-pump Wideband Raman Fiber Amplifiers," *IEEE Proceedings—Optoelectronics*, pp. 74-80, April, 2004, P. M. Reepschlager et al. (EP 1248334), and C. J. Chen et al. (U.S. Pat. No. 6,441,950). Another method is a pump power control technique using a half-analytical Raman power model described by P. Kim and N. Park, "Semi-analytic Dynamic Gain-clamping Method for the Fiber Raman Amplifier," *IEEE Photonics Technology Letter*, pp. 768-770, April, 2005. For the three known methods, the first method is only applicable for a discrete RFA and will also degrade the noise performance, and the third method is too slow (in the millisecond to second range) to be used to suppress Raman transient effects (tens to hundreds of μs for a backward-pumped RFA and tens to hundreds of ns for a forward-pumped RFA).

For the PID-based feedback control method (i.e. method 2), usually the Raman pumps are divided into several wavelength groups (at least two groups for a typical C-/L band WDM system) and the power adjustments of different pump groups are controlled by different feedback loops (each with different feedback signals as shown in FIG. 2). According to FIG. 2, there are first and second pump groups 202-1 and 201-2 controlled by first and second PID control circuits 204-1 and 204-2 which receive feedback via power splitter 203 feeding optical fibers OF1 and OF2 and diodes PD1 and PD2, forming different feedback paths for the two pump groups 202-1 and 202-2 shown. This second method has the capability to control the relatively slow gain transient due to counter-propagating signal-pump Raman interaction in a backward-pumped RFA but is not fast enough to control gain transients due to co-propagating signal-signal and signal-pump Raman interactions in a forward-pumped RFA. In addition, this second method requires a fast channel monitor to provide channel gain spectral information because each feedback loop requires an independent feedback signal. The need for a fast channel monitor not only complicates the amplifier design but also significantly increases cost of the design.

Recently, we, in addition to Mr. M. Feuer, have proposed and demonstrated a simple linear/log-linear feed-forward dynamic gain profile control technique for both a forward-pumped RFA and a backward-pumped RFA, for example, as described in several articles and in U.S. patent application Ser. Nos. 11/273,868 and 11/274,666, filed Nov. 15, 2005, and incorporated herein by reference as to its entire contents. The proposed technique allows us to control very fast gain transients due to both co-propagating signal-signal Raman interaction and co-propagating signal-pump Raman interaction in a forward-pumped RFA. The proposed technique also allows the control speed in a backward-pumped RFA to be accelerated due to the essence of the deterministic algorithm. In our recently filed U.S. patent application Ser. No. 11/424, 312, filed, Jun. 15, 2006, we have extended the proposed Linear/Log-Linear feed-forward control technique from controlling a gain of a single RFA to control an overall gain of multiple cascaded RFAs by adjusting the pump powers of only one RFA or adjusting the pump power of more than one RFA but using only one feed-forward signal monitor. Finally, we have proposed that transient tilt control may be achieved using a fast dynamic gain control of an RFA in U.S. patent application Ser. No. 11/381,244, filed, May 2, 2006.

The proposed feed-forward control technique works well for a forward-pumped distributed/discrete RFA (FIG. 1(a)) as well as a backward-pumped discrete RFA (FIG. 1(b)), though, its advantage in the control of a backward-pumped distributed RFA is not so obvious because the location of the signal monitor and the location of the backward Raman pumps are geographically separated. Therefore, a telemetry channel is required to send the feed-forward signal to the control unit of the backward Raman pumps. For this case, a feedback-based control technique has an advantage because the feedback signal may be monitored right after the RFA. In addition, there is a chance that using a feed-forward dynamic gain control technique alone may not be enough for some ULH WDM system with higher performance/margin requirements. Consequently, one can see that there is still a real need in the art for a faster and more cost-effective feedback-based dynamic gain control technique.

BRIEF SUMMARY OF THE INVENTION

An improved feedback-dynamic gain control technique, in which only one feedback signal is required for control of multiple Raman pumps compares to the traditional method requiring multiple feedback signals discussed above such that the present method results in substantial simplification of the control circuit and also exhibits faster control speed. More over, the proposed method allow us to use the total signal gain as the feedback signal, which is more robust against polarization-related issues than traditional method using signal powers at several different channels as the feedback signals. The impact of polarization-related issues may be reduced for a feed-back based gain control circuit when out-of-band amplified spontaneous emission (ASE) noise is utilized as the feedback signal. In accordance with one aspect of an improved feedback dynamic gain control circuit and technique for a multi-wavelength-pumped Raman fiber amplifier, a dynamic gain control circuit for such a wave division multiplexing system may monitor the power of one single wavelength and control a plurality of Raman pumps. The single monitored wavelength may be one selected from the wavelengths transmitted with a typical WDM signal or may be chosen, as introduced above to comprise amplified spontaneous emission (ASE) noise which is out-of-band from the transmitted signal. According to a second aspect of the improved technique, a dynamic gain control method for a wave division multiplexing system comprising a multi-wavelength-pumped Raman fiber amplifier comprises the steps of monitoring the total power of an input optical signal for a feed-forward control circuit, monitoring one signal wavelength or monitoring the total power of an output optical signal for a feed-backward control circuit and controlling a plurality of Raman pumps via said feed-forward and feedback control circuits, the feed-back circuit having gain control responsive to said monitored input and output optical signals. Other aspects of the improved feedback gain control technique will now be described with reference to the drawings.

DETAILED DESCRIPTION OF A PREFERRED EMBODIMENT

Figure 1A:
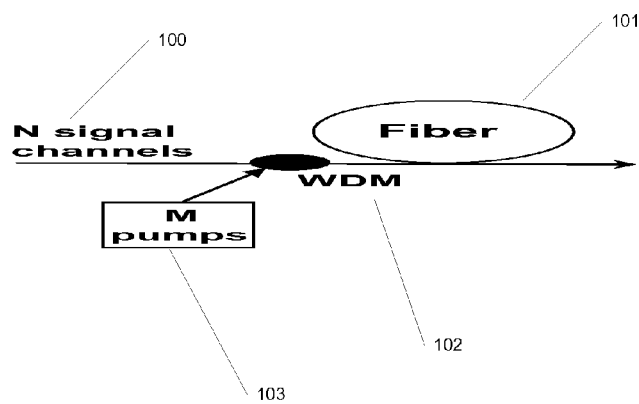
FIG. 1(a) shows a forward-pumped distributed/discrete Raman fiber amplifier.
Figure 1B:
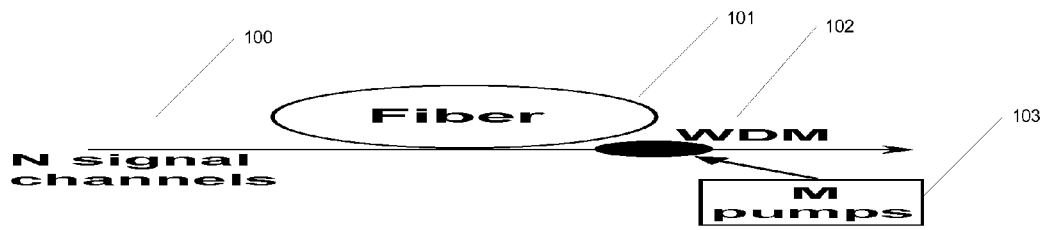
FIG. 1(b) shows a backward-pumped distributed/discrete Raman fiber amplifier, either of which may utilize aspects of the invention.
Figure 1C:
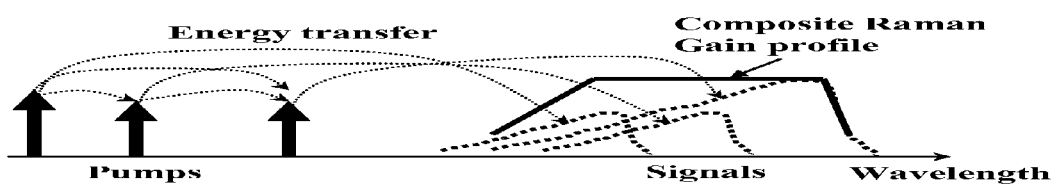
FIG. 1(c) shows how a plurality of pumps may flatten the composite gain characteristic of an optical amplifier over a wide bandwidth.

As discussed briefly in the background of the invention, the total input signal power of a RFA may vary due to intended or accidental channel add/drop in a dynamic optical network. With varying input signal power, the launch powers of the Raman pumps 103 need to be adjusted accordingly in order to maintain a constant gain profile, for example, as shown in FIG. 1(c). Recently we have experimentally found that there exist two approximate linear relationships between the required individual pump power adjustment and the input signal power variation in both forward-pumped RFA and backward-pumped RFA, even with more than one Raman pump and operating in a deep-saturated mode. Moreover, we have found that the required pump power adjustment is mainly determined by the total input signal power variation. Also, the impact of the detailed channel spectral distribution information on the individual pump power adjustment is small and may be neglected for most of the RFAs under practical applications (C-band, L-band, Extended C-band or extended L-band). For convenience, let us consider a RFA with M Raman pumps 103 and N signals 100, for example, as shown in either FIG. 1(a) or 1(b). According to our investigations, the required power adjustment of the j-th pump (j=1 to M) may be approximated as only the linear function of the total input signal power variation $\Delta S_L$ as $$\Delta P_L(j) \approx C_{LL}(j) \Delta S_L \qquad \text{EQ. 1}$$

$$\Delta P_d(j) \approx C_{dL}(j) \Delta S_L \qquad \text{EQ. 2}$$

for any channel drop pattern. In EQ. 1 and 2, $C_{dL}(j)$ and $C_{LL}(j)$ denote the approximate linear coefficients, and the subscripts d and L denote log scale and linear scale, respectively (such a definition holds throughout). The linear coefficients only depend on the passive optical link parameters such as fiber loss in fiber 101 and Raman gain coefficient and therefore can be predetermined by either direct measurement using a predetermined channel drop pattern or by simulation using the measured basic optical link parameters. EQ. 1 and EQ. 2 may be used as the control algorithm of a feed-forward-based dynamic gain control circuit as described, for example, in our article with Mr. Feuer, "Fast, low cost method for control of gain and tilt transients in a forward-pumped Raman amplifier," ECOC 2005, paper We4, p. 36 and our paper "A new technique for dynamic gain profile control in a multi-wavelength backward-pumped discrete Raman amplifier, OFC 2006, paper OWD1, incorporated herein by reference as to subject matter deemed essential to an understanding of the present invention. (EQ. 1 works better for a backward-pumped RFA while EQ. 2 works better for a forward-pumped RFA). The method may also be used to improve the feedback-based dynamic gain control technique as is detailed below.

Figure 2:
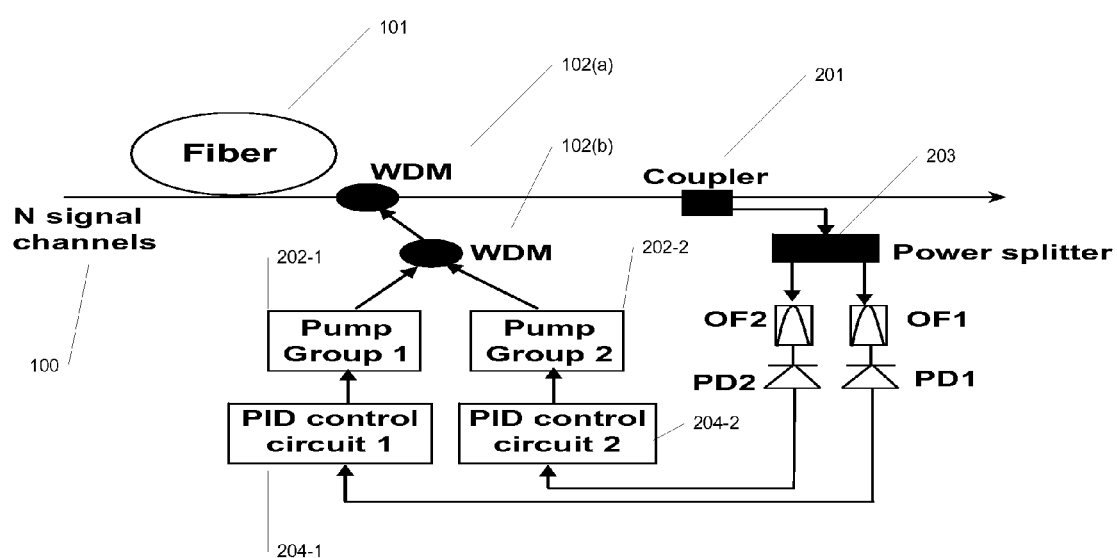
FIG. 2 is a schematic block diagram of a Raman fiber amplifier using PID (proportional-integral-derivative) based feedback pump power control technique having at least two Raman pump groups.

From EQ. 1 and EQ. 2, one can observe that the required power adjustments to maintain a constant gain profile for different Raman pumps 103 (also see FIGS. 1(c) and 2) are not independent. For example, if the required power adjustment of the first Raman pump is known as $\Delta P_L(1)$ or $\Delta P_d(1)$, then the required power adjustments of any other Raman pumps, say the j-th pump, can be given by the following two equations $$\Delta P_L(j) \approx \frac{C_{LL}(j)}{C_{LL}(1)} \Delta P_L(1) \qquad \text{EQ. 3}$$

$$\Delta P_d(j) \approx \frac{C_{dL}(j)}{C_{dL}(1)} \Delta P_d(1) \qquad \text{EQ. 4}$$

One can see that EQ. 3 and EQ. 4 allow us to use only one feedback signal to control multiple Raman pumps 103.

Figure 3:
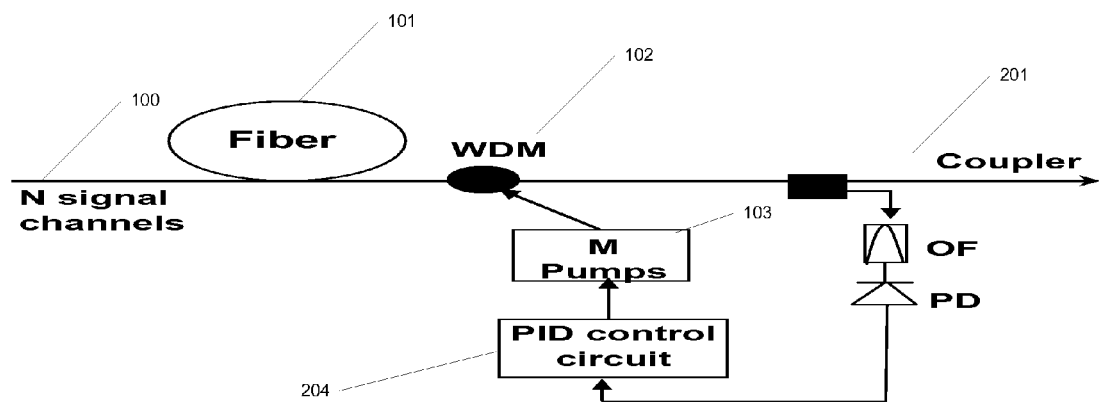
FIG. 3 is a schematic block diagram showing an embodiment of a Raman amplifier where M pumps are controlled by a single PID (proportional-integral-derivative) based feedback control circuit wherein OF denotes an optical filter and PD a photo-detector.

Referring now to FIG. 3, there is shown a first embodiment of the present invention, where the output power at one single wavelength is used as the feedback signal to control the M Raman pumps 103 in a backward-pumped RFA. As an illustration, here, a PID algorithm is used as the control algorithm; (another algorithm such as proportional algorithm may also be used as the feedback control algorithm). For convenience, we assume that the time dependent output power at the shortest-wavelength signal, $S_L(1,t)$, is monitored and used as the feedback signal. Then the dynamic control equation for pump j in accordance with the linear equation of EQ. 1/EQ. 3 is given by $$P_L(j, t+dt) \approx P_L(j, t) + \qquad \text{EQ. 5}$$
$$\frac{C_{LL}(j)}{C_{LL}(1)} \left[ D_0(S_L(1,t) - S_{L0}(1)) + D_1 \frac{d}{dt}(S_L(1,t) - S_{L0}(1)) \right]$$

and the dynamic control equation in accordance with the linear equation of EQ. 2/EQ. 4 is given by $$P_d(j, t+dt) \approx P_d(j, t) + \qquad \text{EQ. 6}$$
$$\frac{C_{dL}(j)}{C_{dL}(1)} \left[ D_0(S_L(1,t) - S_{L0}(1)) + D_1 \frac{d}{dt}(S_L(1,t) - S_{L0}(1)) \right]$$

where $S_{L0}(1)$ denotes the target output power at the shortest wavelength channel as linear scaled, and $D_0$ and $D_1$ denote the common proportional and derivative control coefficients as described by Karasek et al., respectively. Comparing FIG. 3 with FIG. 2, one can see that the proposed control circuit and method is significantly simpler than the exemplary circuit and second method described above involving independent feedback loops. Moreover, the proposed circuit and method of FIG. 3 avoids the extra oscillations that may occur due to independent pump power adjustments in a traditional method using more than one feedback signal and therefore may allow the control speed to be accelerated. In addition, the feedback signal used in FIG. 3. may be one of the normal WDM signal or, as introduced above, it may also be out of signal band ASE (amplified spontaneous emission) noise. The traditional feedback gain control method always uses several independent WDM signals as the feedback signals. But recently we have found that a feedback gain control circuit using independent WDM signals as the feedback signals may suffers from various polarization-related issues because the normal WDM signals are polarized. For example, polarization dependent loss (PDL) from the passive optical components and polarization dependent gain (PDG) from the amplifiers may result in time-dependent per channel power variation even without amplifier gain transients. On the contrary, if we use out of band ASE noise as the feedback signal, the impact of polarization-related issues on the gain control performance can be essentially eliminated because ASE noise is inherently depolarized. In accordance with the present invention, if a WDM transmission system has a relatively high PDL/PDG (e.g. >0.3 dB per span), it is advantageously to monitor one of the out of band ASE noise as the feedback signal. The bandwidth of the monitored ASE noise may be chosen to be wider than the WDM channel spacing to reduce the sensitivity requirement of the power detector. In fact, the whole out of band ASE may be monitored as the feedback signal.

Figure 4A:
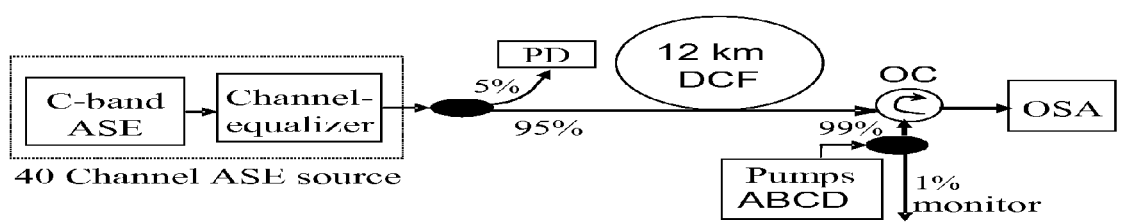
FIG. 4(a) is a schematic block diagram of an experimental system for evaluating the dynamic gain control circuit and method of FIG. 3 and subsequent FIGS. 5, 6(a) and 6(b)
Figure 4B:
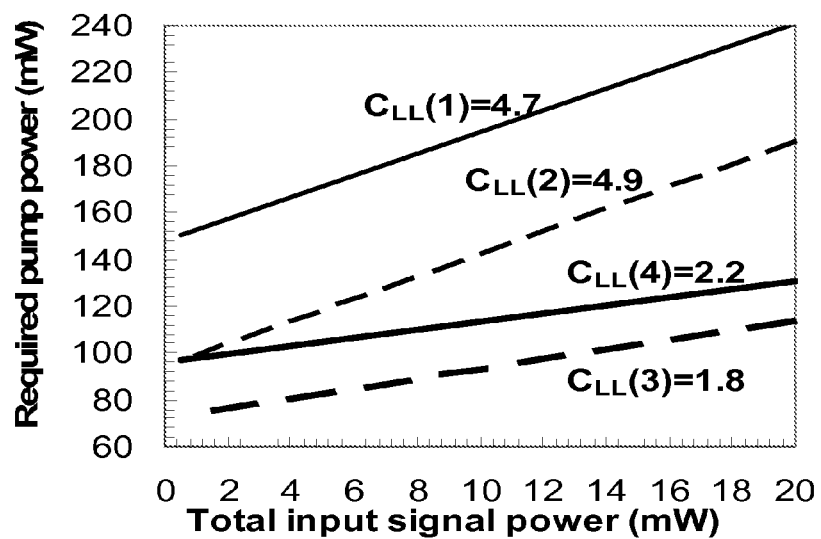
FIG. 4(b) is a graph showing total input signal power versus required pump power for linear coefficients, $C_{LL}(j)$ for j=1 to 4 pumps.

Because the performance of the depicted feedback gain control circuit per FIG. 3 depends on the accuracy of a linear/log-linear relationship of EQ. 1/EQ. 2, an experimental circuit as constructed to verify the validity of the linear relationship between the required individual pump power adjustment and the total input power variation in a four-wavelength backward-pumped RFA as shown in FIG. 4(a). Referring to FIG. 4(a), there is shown our experimental circuit involving a 40 channel ASE source for use at C band. Raman pumps A B C D operate at optical circulator OC. For test purposes, 99% is output to OC and 1% is monitored. FIG. 4 (b) shows the measured linear coefficients (in accordance with EQ. 1) for the four wavelength backward-pumped C-band RFA (per FIG. 4 (a)) with a target gain level of 16 dB, where the four Raman pumps (A, B, C, D) are fiber grating stabilized Fabry-Perot lasers with wavelengths centered at 1425, 1436, 1452 and 1466 nm, respectively. In our experimental embodiment, a flat C-band ASE source is shown followed by an 80-channel, 50 GHz channel equalizer (wavelength blocker or alternative filter) to create up to 40 channels of sliced ASE (power stability better than 0.05 dB per channel) at 100 GHz spacing. We used this ASE source to eliminate uncertainties caused by polarization issues in the experimental arrangement. About 5% of the output of the 40 channel source was tapped off to monitor the total input signal power variation at power detector PD. The 40 wavelengths were launched into a 12 km DCF fiber (as described above, alternative fiber types may be used) at a signal power level of −3 dBm/channel, and an OSA is used for monitoring spectral flatness and total Raman gain per wavelength.

Figure 4C:
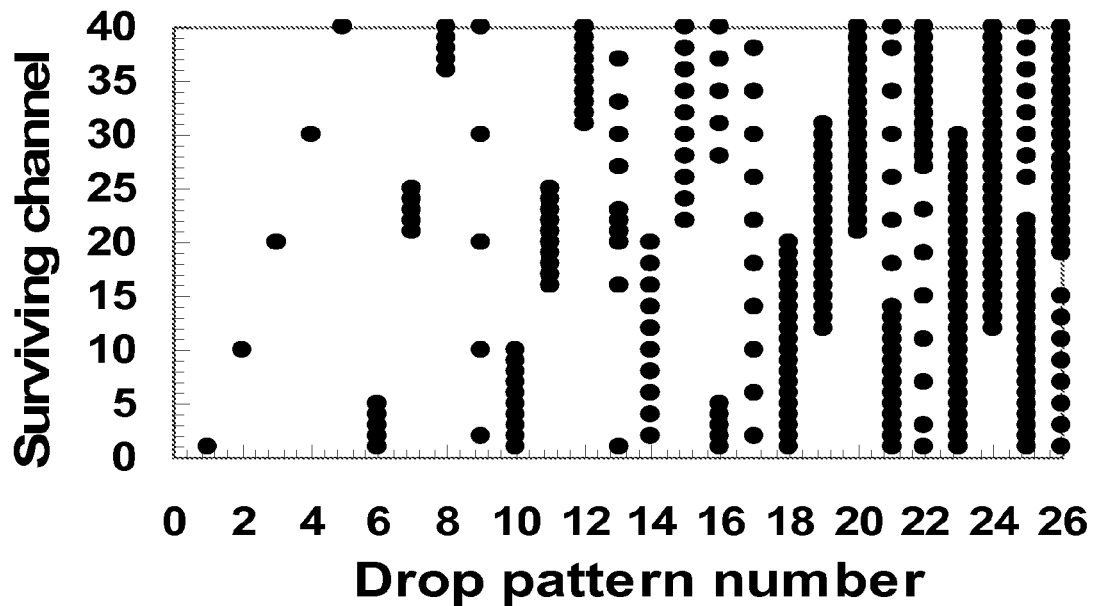
FIGS. 4 (c) and (d) represent graphs for the twenty-six drop patterns for dropping channels and surviving channels and results with and without control.
Figure 4D:
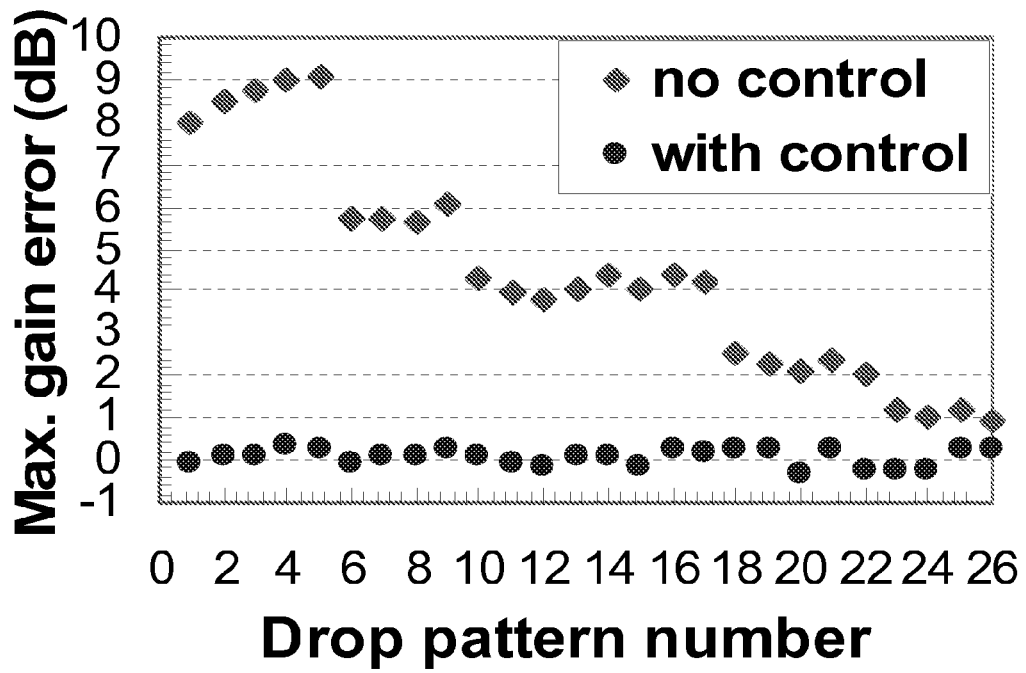

Our method for measuring the approximate linear coefficients for a specific target gain profile is given as follows. First, we measure the required pump power at each pump wavelength given above at a reference operational point. Second, we measure the required power adjustment (relative to the reference point) of each Raman pump A, B, C and D at a predetermined channel drop pattern. Let $\Delta P_L(j)$ denote the required power adjustment of pump j in accordance with a total input signal power variation of $\Delta S_L$, then, the approximate linear coefficient of pump j is given by $\Delta P_L(j)/\Delta S_L$. In the experimental arrangement of FIG. 4(a), we chose full load (with all 40 signal channels) as the reference point, and a channel pattern with evenly distributed 10 signal channels was used as the predetermined channel drop pattern. The measured results are illustrated in FIG. 4 (b). The validity of the approximate linear relationship of Total input signal power in milliWatts versus Required pump power in milliWatts shown in FIG. 4 (b) has been verified by using them as the control algorithm in a feed-forward-based dynamic gain control circuit with twenty-six distinctive channel drop patterns as shown in FIGS. 4(c) and 4(d). FIG. 4 (c) shows the twenty-six distinctive channel drop patterns that may be used as an effective gain control performance test, and FIG. 4(d) shows the measured maximum gain deviation (the worst wavelength) at various channel drop patterns with and without control. One can see from FIG. 4(d) that the linear control algorithm works very well for all the twenty-six patterns, correcting up to 9 dB gain deviation (drop pattern 4) to within 0.32 dB.

Figure 5:
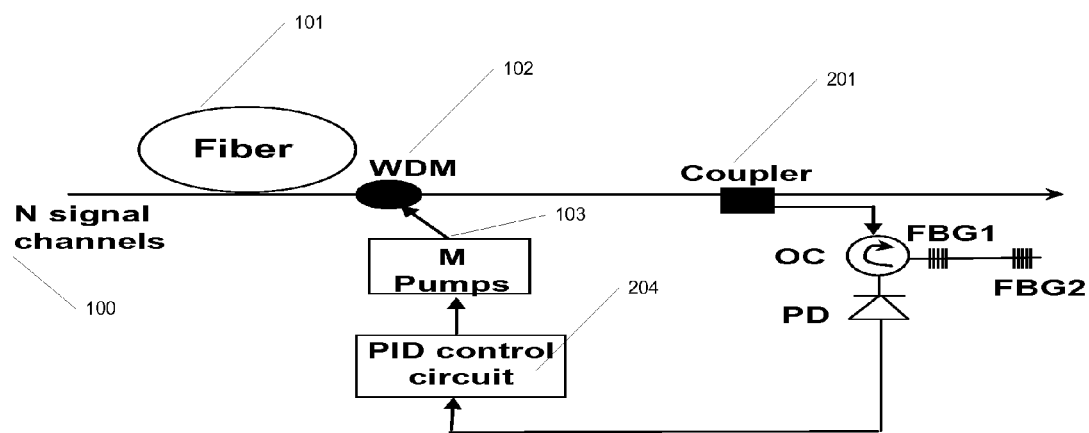
FIG. 5 is a schematic block diagram showing a further embodiment of a gain control circuit and technique including an optical coupler OC and fiber Bragg gratings for monitoring two wavelengths of interest.

FIG. 5 shows a second embodiment of the present invention. N signal channels 100 are shown lighting fiber 101 in a WDM system 102 having M pumps 103. A coupler 201 provides a feedback signal to optical circulator OC where diode PD detects a signal for PID control circuit 204. The sum of the output signal powers at several different WDM wavelengths are monitored as the feedback signal. In this specific example, the power sum at two different wavelengths is monitored by using optical circulator OC with two cascaded FBGs (fiber Bragg grating, a reflective optical filter) designated FBG1 and FBG2. Theoretically, three or more wavelengths may be monitored using corresponding additional fiber Bragg gratings. Simply by replacing the output signal power at a single wavelength in the first embodiment with the power sum of several wavelengths, EQ. 5 or EQ. 6 may be used as the dynamic control equation of FIG. 5 for PID control circuit 204. Compared to the second method shown in FIG. 2, the method shown in FIG. 5 may achieve faster control speed, better performance and slightly reduced complexity. Compared to the first embodiment of FIG. 3, the circuit and method of FIG. 5 may achieve better performance but at the cost of increased complexity.

Figure 6A:
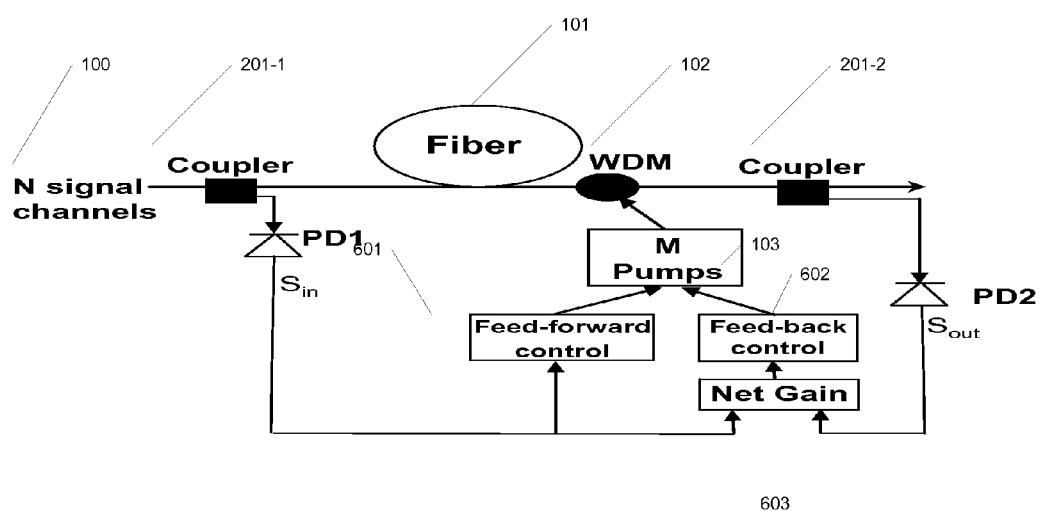
FIG. 6(a) is a schematic block diagram showing a further embodiment of a gain control circuit and technique providing both feed-forward and feed-back control for M pumps 103 and FIG. 6(b) is a similar schematic block diagram to FIG. 6(a) showing an optical supervisory channel between control circuits for feed-forward control.
Figure 6B:
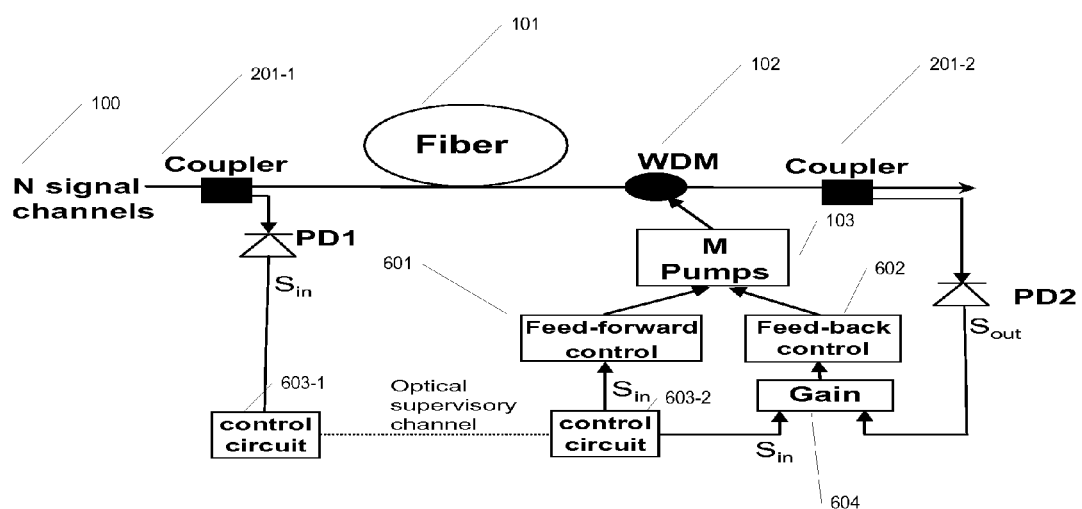

FIGS. 6 (a) and (b) illustrate a third embodiment of the present invention. FIGS. 6(a) and 6(b) differ in the use by FIG. 6(b), not shown in FIG. 6(a), of an optical supervisory channel and first and second control circuits 603-1 and 603-2 for providing gain and feed-forward signals $S_{in}$. Both the total input signal power $S_{in}$ and the total output signal power $S_{out}$ are monitored in the embodiments of FIGS. 6(a) and 6(b). The total input signal power $S_{in}$ is used as the feed-forward signal for the feed-forward control circuit 601, and the total gain (defined as $S_{out}/S_{in}$) is used as the feedback signal for the feed-back control circuit 602. For the feed-forward control circuit 601, EQ. 1 or EQ. 2 may be used as the control equation. For the feed-back control circuit 602, EQ. 5 or EQ. 6 may be used as the control equation (replacing the output signal power with the total gain). For a backward-pumped discrete RFA, both $S_{in}$ and $S_{out}$ may be monitored right before/after the RFA as is shown in FIGS. 6 (a) and 6(b) at couplers 201-1 or 201-2. But for a backward-pumped distributed RFA, as is shown in FIG. 6(b), a telemetry channel may be required (the existing optical supervisory channel may be used as the telemetry channel) to send the information of $S_{in}$ to the control unit (circuits 601) of the Raman pumps as is shown in FIG. 6 (b). In the case that the time delay between the control branch and the signal transmission branch is beyond the system requirement, an extra fiber delay line may be introduced in the transmission path (not shown) between the N signal channel source 100, coupler 201-1 through fiber 101 and WDM 102 to coupler 201-2 of either FIG. 6(a) or 6(b). Because the circuits and methods shown in FIGS. 6(a) and 6(b) use the total signal gain as the feedback signal, it is more robust against polarization-related issues (such as polarization dependent loss/gain) than the traditional method using signal powers at several signal wavelengths as the feedback signals. In addition, using the total signal gain as the feedback signal also allows us to add a feed-forward control almost at no cost (no need to add extra monitor for the feed-forward control circuit). The use of both feed-forward and feedback controls may achieve better performance than using each of them alone.

The above three example embodiments all are backward-pumped RFA, though, the proposed method may also be used in a forward-pumped RFA, especially in a forward-pumped discrete RFA. More over, the proposed method may be used to control the overall gain of multiple cascaded RFAs (each RFA may be a forward-pumped RFA or a backward-pumped RFA) by adjusting the pump powers of only one RFA through the proposed feedback control technique. For example, the proposed feedback control technique may be used to control the overall gain of a bi-directionally pumped WDM system (using both forward-pumped RFA and backward-pumped RFA in the same fiber) by adjusting the pump powers of only the backward-pumped RFA or only the forward-pumped RFA.

Thus, there has been shown and described improved feedback-based dynamic gain control circuits and techniques for a WDM system using a multi-wavelength-pumped RFA, in which only one feedback signal is required for control of multiple Raman pumps. Compared to the traditional method requiring multiple feedback signals, the proposed method results in substantial simplification of the control circuit and also exhibits faster control speed. Moreover, the proposed method allows the total signal gain to be used as the feedback signal, which is more robust against polarization-related issues than the traditional method using signal powers at several different channels as the feedback signals. Using the total signal gain as the feedback signal also allows us to introduce a feed-forward control circuit without adding extra feed-forward signal monitoring. The described circuits and methods may be combined or used separately, used in forward and backward pumped applications and for feed forward or feedback. The invention should only be deemed to be limited in scope by the claims that follow.

What we claim is:

1. A dynamic gain control circuit for a wave division multiplexing system comprising a multi-wavelength-pumped Raman fiber amplifier, the dynamic gain control circuit for monitoring only a single optical signal wavelength selected from a plurality of wavelengths transmitted via the wave division multiplexing system, controlling a plurality (M) of Raman pumps based on an output power at the single optical signal wavelength, using the output power as a feedback signal for controlling the plurality (M) of Raman pumps wherein a required power adjustment ($\Delta P_L$) for a jth Raman pump (j=1 to M) of the plurality (M) of Raman pumps is based on a linear function of a total input signal power variation ($\Delta S_L$), the linear function being defined as $$\Delta P_L(j) \approx C_{LL}(j) \Delta S_L,$$

wherein $C_{LL}$ is a coefficient.

2. A dynamic gain control circuit according to claim 1 further comprising a signal coupler for providing the single optical signal wavelength.

3. A dynamic gain control circuit according to claim 2 further comprising at least two fiber Bragg gratings for monitoring at least two signal wavelengths.

4. A dynamic gain control circuit according to claim 2 having a first coupler for monitoring an input signal to a feed-forward control circuit and a second coupler for monitoring an output signal to a feed-back control circuit.

5. A dynamic gain control circuit according to claim 4 further comprising a gain circuit coupled to said feed-back control circuit for controlling gain in response to monitored input and output optical signals.

6. A dynamic gain control circuit according to claim 4 further comprising a telemetry channel for said feed-forward control circuit.

7. A dynamic gain control method for a wave division multiplexing system comprising a multi-wavelength-pumped Raman fiber amplifier, the dynamic gain control method comprising the steps of monitoring only a single optical signal wavelength selected from a plurality of wavelengths transmitted via the wave division multiplexing system, controlling a plurality (M) of Raman pumps based on an output power at the single optical signal wavelength, using the output power as a feedback signal for controlling the plurality (M) of Raman pumps wherein a required power adjustment ($\Delta P_L$) for a jth Raman pump (j=1 to M) of the plurality (M) of Raman pumps is based on a linear function of a total input signal power variation ($\Delta S_L$), the linear function being defined as $$\Delta P_L(j) \approx C_{LL}(j) \Delta S_L,$$

wherein $C_{LL}$ is a coefficient.

8. A dynamic gain control method according to claim 7 further comprising the step of coupling to an optical signal source for providing the single optical signal wavelength.

9. A dynamic gain control method according to claim 8 further comprising the step of filtering a monitored optical signal using at least two optical filters for monitoring at least two signal wavelengths.

10. A dynamic gain control method according to claim 9 wherein said optical filters comprise fiber Bragg gratings.

11. A dynamic gain control method according to claim 7 wherein said coupling step comprises monitoring an input optical signal to a feed-forward control circuit and monitoring an output optical signal to a feed-back control circuit.

12. A dynamic gain control method according to claim 11 further comprising the step of controlling gain to said feed-back control circuit in response to monitored input and output optical signals.

13. A dynamic gain control method according to claim 4 further comprising the step of using a telemetry channel for said feed-forward control circuit.

* * * * *